Dec. 28, 1965 V. F. DAHLGREN 3,226,473

ENCAPSULATED CONDUCTIVE PATHS WITH READILY
REMOVABLE INSULATION

Filed March 4, 1963

Victor F. Dahlgren
*INVENTOR*

Robert O. Richardson
*ATTORNEY*

Patented Dec. 28, 1965

3,226,473

ENCAPSULATED CONDUCTIVE PATHS WITH READILY REMOVABLE INSULATION

Victor F. Dahlgren, Chelmsford, Mass., assignor to Sanders Associates, Inc., Nashua, N.H., a corporation of Delaware Filed Mar. 4, 1963, Ser. No. 263,380
5 Claims. (Cl. 174—117)

This application is a continuation-in-part of my copending patent application Serial No. 60,638, filed October 5, 1960, now abandoned.

This invention relates to a method of exposing copper terminal connections in a flexible plastic encapsulated circuit so that these terminals may be soldered to external components or circuits when desired.

In the lamination of copper conductive strips between flexible plastic layers, suitable terminals for connecting components or other circuitry thereto have been made by pre-punching holes in the top layer before lamination, so that the desired portions are exposed and available for soldering. However, it has been found that in the lamination process adjacent conductors tend to move or flow laterally into the holes, since there are no balancing pressures at the holes. Another problem with pre-punched holes in the top cover is that of registration between the holes and the conductors. Also, if there is overpressurization or temperature in the bonding, the top cover will tend to flow into the pre-punched hole portion, covering the terminal. This presents another problem, in that the plastic around the pre-punched holes in the top cover tends to flow into the holes during lamination, making the thickness of the top cover adjacent to the holes thinner than desired, as well as making the terminal opening smaller than desired. Another method of exposing portions of the conductors is to cut through the top cover with an abrasive or by heat. However, this presents the problem of complete cleaning of the terminal so that no thin transparent film of plastic remains. Also, the scratching of the terminal is not acceptable in many instances, such as when brazing is to be done.

These problems have all been corrected in the method and articles made thereby which comprise the present invention, wherein desired portions of the conductive paths may readily be exposed as needed or desired. Before the lamination of the top cover, the conductive path is covered at a point where ultimate exposure might be desired. This prevents bonding of the top cover to the conductive path at this point so that the lamination may be readily removed from that area.

Another object is the provision of a flexible circuit with removable cover portions.

Figure 1:
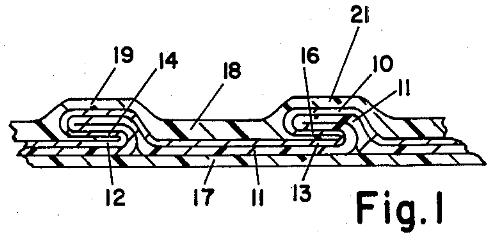
Figure 3:
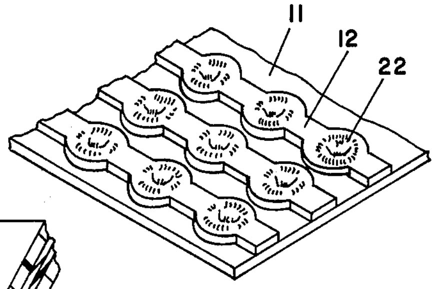
Figure 2:
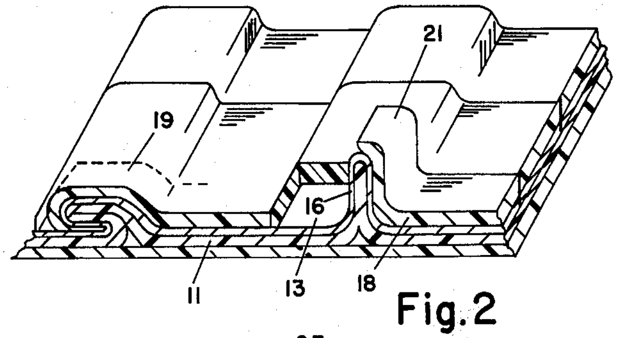
Figures 4, 5:
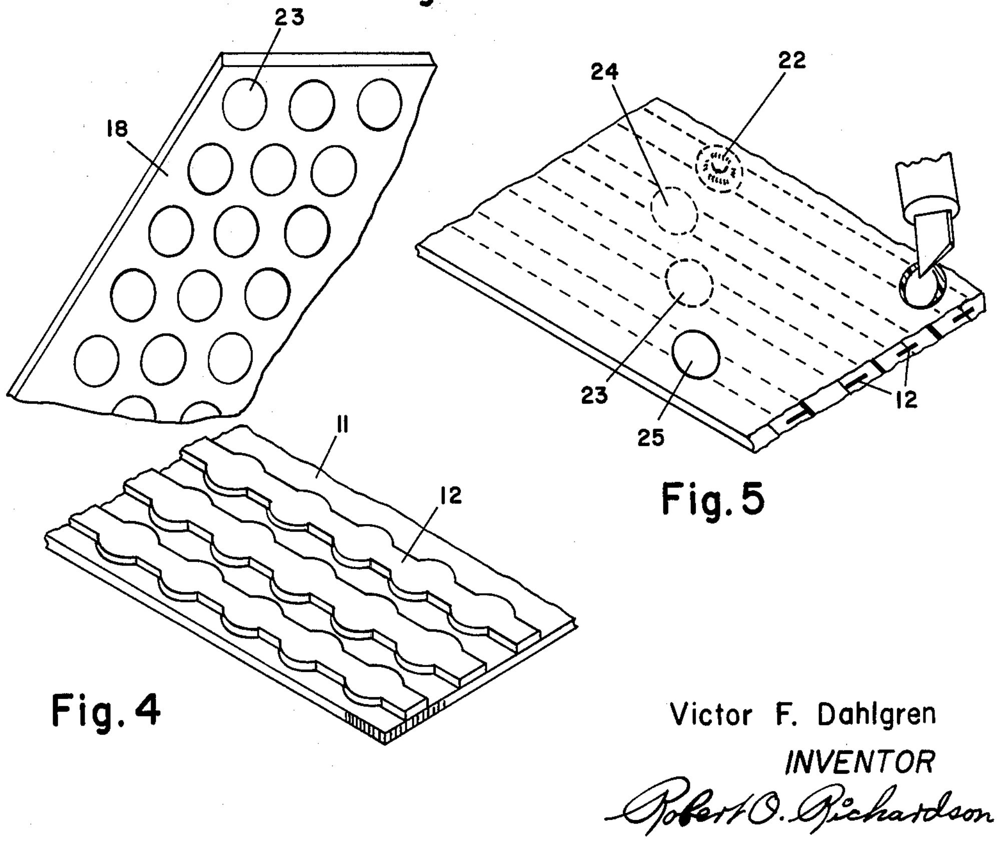

These and other objects will become more apparent as a description of the invention proceeds with reference to the drawings wherein, FIG. 1 is a cross-sectional view of a conductor folded over previous to laminating the top cover, FIG. 2 is a perspective view of the same circuit with the cover of one of the fold-over connections cut and the fold-over portion straightened up to expose a part of the path for a connection, FIG. 3 shows a conductor mounted on a base wherein portions of the conductor are depressed such that a top cover will not contact the recess in lamination, FIG. 4 shows the conductors on a base and copper buttons attached to the top layer for matching and placement over desired exposed areas on the terminals of the base conductors, and FIG. 5 is a perspective view showing a plurality of ways of avoiding contact of the top cover wtih preselected areas on the conductor when the cover is laminated.

In application Serial Number 21,272, filed April 11, 1960, now Patent Number 2,997,521 entitled "Insulated Electric Circuit Assembly," there is described a method of making flexible circuits between laminations of plastic material. A sheet of cupric oxide coated copper is first laminated to a base of flexible plastic material and unwanted portions of copper are then removed to provide the desired circuit configuration. As shown in FIG. 1, numeral 10 represents the copper conductive path laminated to a base 11. In FIG. 1, portions 12 and 13 are portions of this circuit 10 wherein it may be desirable to solder a connection to some other circuit or electrical component. At this point, the flexible base portion and conductor is bent back upon itself such that portion 14 lies directly over portion 12 and portion 16 lies over portion 13. The circuit is then bent back upon itself again and continues in its normal direction. A second base sheet 17 is then affixed to the bottom portion 11 and the cover coat 18 is bonded thereto under suitable heat and temperature as further explained in the application referred to above. Although the plastic material is sufficiently clear to see the outline of the conductive paths and to readily determine those portions such as 12 and 13 which have not been bonded to the top layer, raised portions 19 and 21 readily indicate where these unbonded portions of the conductors are located.

As shown in FIG. 2, by simply inserting a sharp blade around the folded-over portion and then bending the folded-over portion up out of the way, the unbonded portion 13 is readily available for soldering.

As shown in FIG. 3, the base portion 11 has the conductors 12 mounted thereon in the same manner as before. In this modification, however, at points of possible desired exposure of the conductor 12, the conductor is recessed as at 22. This recessed portion or dimpled area as it may be called can be formed by a tapping of the conductor with a blunt pointed tool. When a cover coat, not shown in FIG. 3, is bonded thereto, it will leave the dimple portion unbonded. The unbonded area inherently maintains a grey hue and therefore the dimpled area is readily ascertainable to a viewer. By simply cutting around the grey area with a sharp knife the cover coat can readily be removed, exposing the conductor underneath for making a soldered connection.

Referring now to FIG. 4, a further modification may be seen. In this instance a cover layer 18 is also provided with a copper oxide coated sheet of copper bonded thereto, and unwanted portions are removed leaving circular buttons 23 as shown. The circular buttons 23 or disks as they may be called are shown embedded in apertures in the cover layer 18. These are matched over those portions of the conductive paths 12 to which bonding of the top cover is not desired. After lamination these buttons or disks 23 are easily snapped out, for example, by rolling or bending the flexible circuitry. The buttons, as the circuitry is flexed, tend to cut the top cover layer 18 and protrude for easy removal. In many cases they will pop out completely. Other times a sharp instrument is used to cut around a portion of the periphery to release it from the assembly, exposing part of the path below for an external connection.

As shown in FIG. 5, an unbonded conductor portion 24 may be caused by a gas pocket between the top cover and the conductor. One example of forming such a gas pocket is by placing some foreign matter such as blowing agent, BL–63, on the conductor portion where it is desired to maintain an unbonded portion. The heat during the bonding process causes the material to form a gas barrier between the layers of plastic. This blisters the top cover for easy removal without damage to the conductor underneath.

Also shown in FIG. 5 is an exteriorly exposed button 25 which may be used in instances where it is definitely decided that the conductive path underneath should be and will be exposed for exterior connection. In such cases the top cover may have suitable apertures therein which are adapted to be positioned over the exposed portions of the conductor. After the top cover has been positioned over the base and before lamination, these copper buttons are then inserted into the hole thus provided. This keeps the copper path below protected during the laminating process, it prevents inward flow of the plastic of the cover coat and also deters any upward swimming or movement of the conductor on the base below. After the lamination, these copper buttons are easily snapped out, even without the use of a cutting instrument.

Having thus described the principal concepts of the present invention with the preferred embodiments thereof, it is to be understood that the foregoing is by way of illustration only and is not considered as placing limitations on the invention. The scope of the present invention is to be construed as broadly as possible within the limitations of the appended claims.

What is claimed is:

1. A flexible circuit of conductive paths laminated between sheets of thermoplastic material wherein pre-selected portions of said conductive paths are recessed and thereby unbonded to the plastic material thereover, the thermoplastic material over but not bonded to said recessed portions being readily removed to thereby expose said recessed portions for electrical connection to external circuits and components.

2. A flexible circuit of conductive paths bonded to a base layer of thermoplastic material, a top layer of thermoplastic material, said conductive paths having portions thereon wherein thermoplastic bonding thereto is not desired, said top layer having individual button-like elements bonded thereto and adapted to be positioned over said portions of said conductive paths, said top layer being bonded to said base and said conductive paths with said button-like elements abutting and being positioned over those portions to which bonding is not desired.

3. A flexible circuit of conductive paths on a base of thermoplastic material, said conductive circuit paths having portions of said conductive circuit paths each being folded back upon itself such that each folded back portion is in abutting contact with said conductive paths, said base and said conductive paths being covered with a top coat of thermoplastic material.

4. A flexible circuit conductive path between layers of flexible thermoplastic material bonded thereto with gas pockets at predetermined positions on said conductive path to prevent bonding of the top thermoplastic cover to that portion of said conductive path, the top portion being removed when desired and without damage to said conductive path.

5. A circuit path bonded to and encapsulated between layers of thermoplastic material, one of said layers having an aperture therein with a disk embedded within said aperture, said disk being positioned in contact with said circuit path upon removal of said disk, the circuit path therebelow is exposed for external connection to electrical components, such as by soldering.

References Cited by the Examiner

UNITED STATES PATENTS

| | | | |
|---|---|---|---|
| 2,973,502 | 2/1961 | Tally | 174—117 X |
| 3,079,458 | 2/1963 | Hedstrom | 174—117 X |

JOHN F. BURNS, *Primary Examiner.*

JOHN P. WILDMAN, DARRELL L. CLAY, *Examiners.*